R. G. PIKE.
COMBINATION SPIRIT LEVEL AND FOLDING RULE.
APPLICATION FILED MAR. 22, 1910.
973,458.
MODEL.
Patented Oct. 18, 1910.
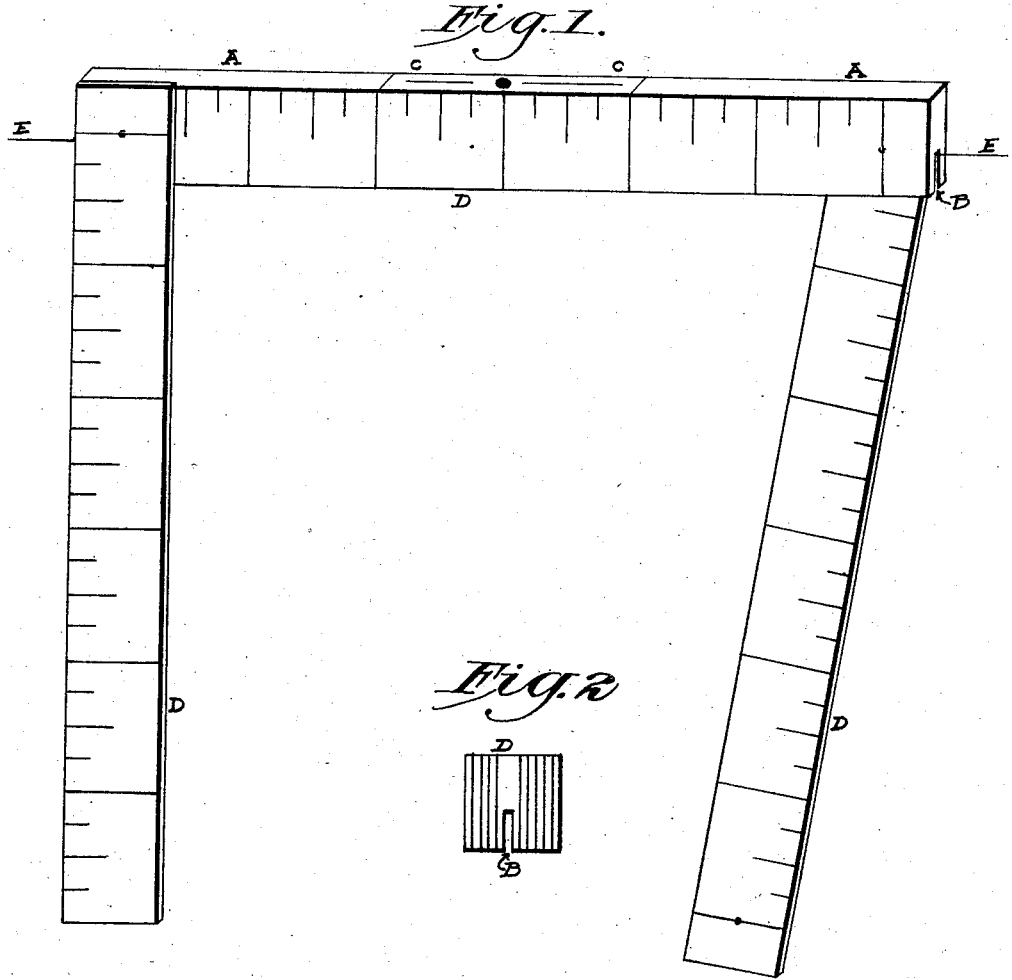

UNITED STATES PATENT OFFICE.

ROBERT G. PIKE, OF MIDDLETOWN, CONNECTICUT.

COMBINATION SPIRIT-LEVEL AND FOLDING RULE.

973,458.    Specification of Letters Patent.    Patented Oct. 18, 1910.

Application filed March 22, 1910. Serial No. 551,008.

*To all whom it may concern:*

Be it known that I, ROBERT G. PIKE, a citizen of the United States, residing at the city of Middletown, in the county of Middlesex and State of Connecticut, have invented a new and useful improvement in a combination spirit-level and folding rule for the purpose of leveling and measuring, in combination with a taut-drawn line, cord, or wire, or both.

My invention is a portable device comprising a graduated folding rule and level in one, to be used in combination with a taut drawn line to ascertain levels and grades.

The parts are made of wood, glass and metal or other suitable material, and are described as follows, reference being had to the accompanying drawing which makes a part of this specification, that is to say:

In the drawings, Figure 1 is a perspective view of my invention, applied to a taut line as in use, and Fig. 2 is an end view of the device in folded position.

A, is an extra thick six-inch long, more or less if desired, graduated section of a folding rule, made of any desirable length, into which is built and securely fastened spirit level C, on the upper edge of A, and centered from both ends.

B, is a longitudinally cut groove, cut sufficiently deep up into the bottom edge of A to receive a taut drawn line E, and allow the device to hang suspended therefrom after dropping the six-inch graduated sections D, at corresponding ends of A, which go to make the fully extended rule, thus balancing the improvised level with the bubble in the level C, on its top surface conveniently for reading a level or grade. All the graduated sections are properly hinged, to unfold or be partly folded for use as a measuring rule or suspended on line E, for leveling grades, or when closed to level on a flat surface.

Now what I claim and desire to secure by Letters Patent of the United States is as follows, viz:

A combination folding rule and spirit level consisting of a folding rule D, having a thick, graduated section of any desired length, said thick section having embedded therein a spirit level C, and being provided with a longitudinal groove B, whereby the device may be suspended from a taut line E.

ROBERT G. PIKE.

Witnesses:
 FREDERICK VINAL,
 EDMUND A. HUTCHINS.